United States Patent
DiPrete et al.

(10) Patent No.: US 8,581,195 B2
(45) Date of Patent: Nov. 12, 2013

(54) SYSTEM AND METHOD FOR ASSAYING RADIATION

(75) Inventors: David P. DiPrete, Evans, GA (US); Tad Whiteside, Aiken, SC (US); Donald J. Pak, Martinez, GA (US); Cecilia C. DiPrete, Evans, GA (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 232 days.

(21) Appl. No.: 13/301,328

(22) Filed: Nov. 21, 2011

(65) Prior Publication Data

US 2013/0126740 A1 May 23, 2013

(51) Int. Cl.
  *G01T 1/20* (2006.01)
(52) U.S. Cl.
  USPC ........................................ 250/361 R; 250/362
(58) Field of Classification Search
  USPC ....... 250/336.1, 361 R, 362, 363.1, 366, 367, 250/369
  See application file for complete search history.

(56) References Cited

U.S. PATENT DOCUMENTS

| | | | | |
|---|---|---|---|---|
| 5,298,753 | A | * | 3/1994 | Sonne et al. ................... 250/364 |
| 5,416,329 | A | * | 5/1995 | Sonne et al. ................... 250/364 |
| 7,005,646 | B1 | | 2/2006 | Jordanov et al. |
| 7,049,598 | B1 | | 5/2006 | Jordanov et al. |

OTHER PUBLICATIONS

Hidex Triathler, www.hidex.com.

* cited by examiner

*Primary Examiner* — Mark R Gaworecki
(74) *Attorney, Agent, or Firm* — Dority & Manning, PA

(57) ABSTRACT

A system for assaying radiation includes a sample holder configured to hold a liquid scintillation solution. A photomultiplier receives light from the liquid scintillation solution and generates a signal reflective of the light. A control circuit biases the photomultiplier and receives the signal from the photomultiplier reflective of the light. A light impermeable casing surrounds the sample holder, photomultiplier, and control circuit. A method for assaying radiation includes placing a sample in a liquid scintillation solution, placing the liquid scintillation solution in a sample holder, and placing the sample holder inside a light impermeable casing. The method further includes positioning a photomultiplier inside the light impermeable casing and supplying power to a control circuit inside the light impermeable casing.

20 Claims, 3 Drawing Sheets

SYSTEM AND METHOD FOR ASSAYING RADIATION

FEDERAL RESEARCH STATEMENT

This invention was made with Government support under Contract No. DE-AC09-085R22470, awarded by the U.S. Department of Energy. The Government has certain rights in the invention.

FIELD OF THE INVENTION

The present invention generally involves a system and method for assaying radiation. In particular embodiments, the system and method may detect and/or measure low energy beta and/or alpha emissions produced by radionuclides including, but not limited to, tritium.

BACKGROUND OF THE INVENTION

Radionuclides naturally decay according to known and predictable decay chains, producing alpha, beta, and/or gamma emissions. Various systems and methods are known in the art for detecting and/or measuring each type of radiation. For example, scintillation detectors are highly sensitive to alpha, beta, and gamma emissions. In a scintillation detector, emissions produced by a sample interact with a scintillator to produce light pulses. A photomultiplier optically connected to the scintillator amplifies the light pulses and produces a signal corresponding to the occurrence and/or magnitude of each light pulse. A control circuit may supply power to the photomultiplier and/or process the signals from the photomultiplier to determine the presence and/or amount of radiation present in the sample.

A solid scintillation detector generally includes a light impermeable barrier that encloses the scintillator and photomultiplier to prevent the sample from contaminating the scintillator and to prevent exposing the photomultiplier to ambient light. Although gamma emissions can readily penetrate the barrier, low energy beta (i.e., less than approximately 1 MeV) and alpha emissions are not able to penetrate the barrier to reach the scintillator. As a result, solid scintillation detectors are not suited for detecting and/or assaying low energy beta or alpha emissions.

Liquid scintillation detectors, however, may be used to detect and/or assay low energy beta or alpha emissions. A liquid scintillation detector generally includes a liquid cocktail having a fluorescent material or scintillator in solution. Samples containing low energy beta and/or alpha emitters may be immersed in the liquid cocktail so that the beta and/or alpha emissions from the sample may interact with the fluorescent material or scintillator to produce light pulses. The light pulses may again be amplified by a photomultiplier and processed by a control circuit to determine the presence and/or amount of beta and/or alpha radiation in the sample.

Although portable solid scintillation detectors have been developed to enable remote monitoring for gamma and higher energy beta emissions, the components included in liquid scintillation detectors have heretofore resulted in larger and heavier detectors than solid scintillation detectors, limiting the ability to remotely monitor for low energy beta and alpha emissions. As a result, a portable system and method for assaying low energy beta and/or alpha emissions would be useful.

BRIEF DESCRIPTION OF THE INVENTION

Aspects and advantages of the invention are set forth below in the following description, or may be obvious from the description, or may be learned through practice of the invention.

One embodiment of the present invention is a system for assaying radiation that includes a sample holder configured to hold a liquid scintillation solution. A photomultiplier is operably positioned at a predetermined geometry from the sample holder, and the photomultiplier receives light from the liquid scintillation solution and generates a signal reflective of the light. A control circuit is operably connected to the photomultiplier, and the control circuit electrically biases the photomultiplier and receives the signal from the photomultiplier reflective of the light from the liquid scintillation solution. A light impermeable casing surrounds the sample holder, photomultiplier, and control circuit.

Another embodiment of the present invention is a system for assaying radiation that includes a cap and a body releasably connected to the cap, wherein the cap and body form a light impermeable casing when connected together. A sample holder inside the cap is configured to hold a liquid scintillation solution. A photomultiplier is inside the body at a predetermined geometry from the sample holder when the cap is connected to the body, and the photomultiplier receives light from the liquid scintillation solution and generates a signal reflective of the light. A control circuit is inside the body and operably connected to the photomultiplier, and the control circuit electrically biases the photomultiplier and receives the signal from the photomultiplier reflective of the light from the liquid scintillation solution.

Embodiments of the present invention may also include a method for assaying radiation that includes placing a sample in a liquid scintillation solution, placing the liquid scintillation solution in a sample holder, and placing the sample holder inside a light impermeable casing. The method further includes positioning a photomultiplier inside the light impermeable casing at a predetermined geometry from the sample holder and supplying power to a control circuit inside the light impermeable casing.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
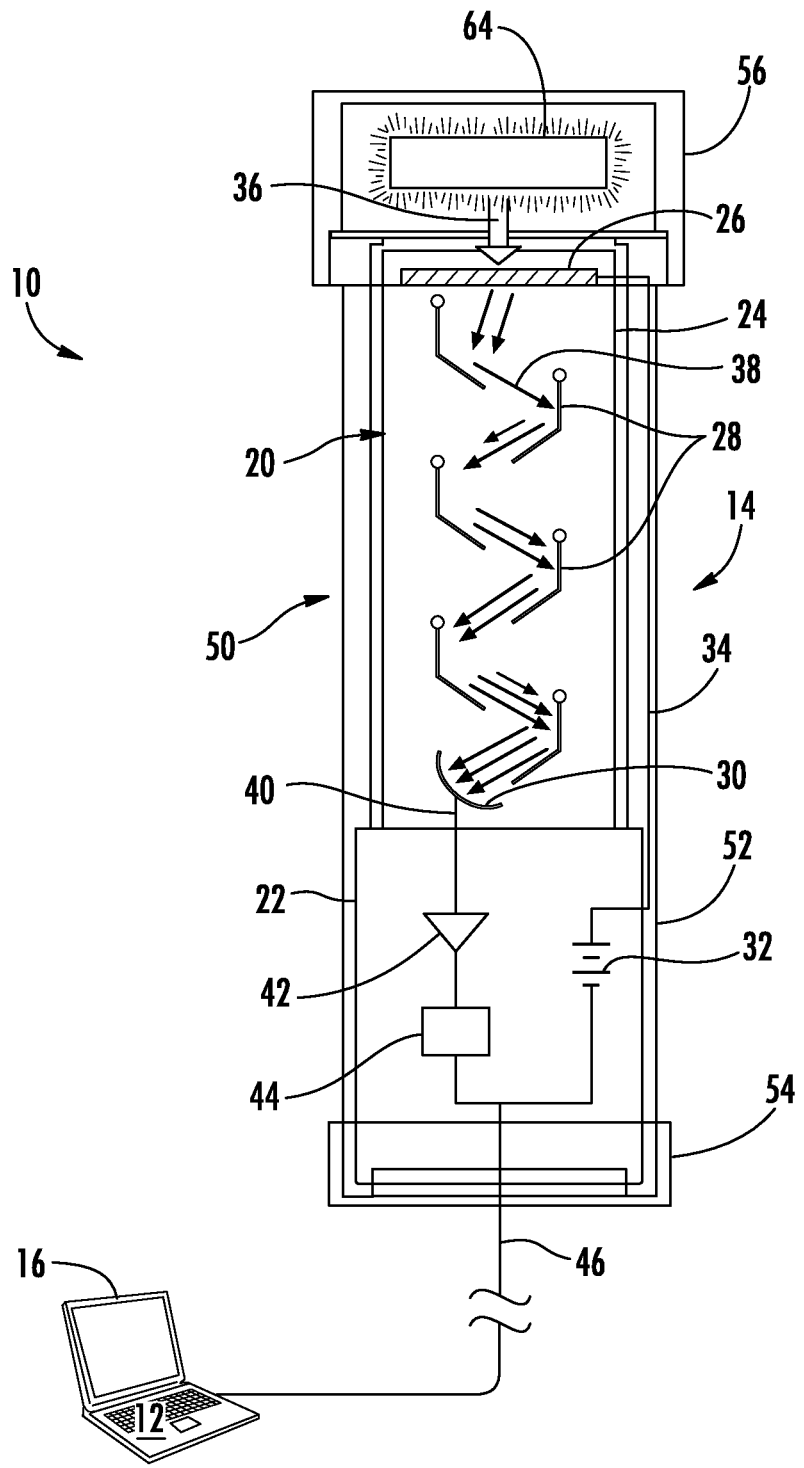
FIG. 1 is a plan view of a system for assaying radiation according to one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

FIG. 1 provides a plan view of a system 10 for assaying radiation according to one embodiment of the present invention. As shown, the system 10 generally includes a processor 12 operably connected to a detector 14.

The technical effect of the processor 12 is to supply power to the detector 14 and/or provide a graphic user interface between the detector 14 and an operator. Embodiments of the systems and methods set forth herein may be implemented by one or more general-purpose or customized processors 12 adapted in any suitable manner to provide the desired functionality. As used herein, the processor 12 may include any combination of microprocessors, hardwired logic, or other programmed logic circuitry and is not limited to any particular hardware or software architecture or configuration. The processor 12 may be adapted to provide additional functionality, either complementary or unrelated to the present subject matter. In particular embodiments, the processor 12 may include onboard flash or volatile memory and/or associated non-volatile memory. In addition, the processor 12 may include one or more interface connections, such as a USB port, a firewire, or similar pathway, to a remote storage device. In this manner, data and/or programming instructions may be communicated to or from the processor 12, as desired. When software is used, any suitable programming, scripting, or other type of language or combinations of languages may be used to implement the teachings contained herein. As shown in FIG. 1, for example, the processor 12 may be incorporated into a lap top computer 16. In alternate embodiments, the processor 12 may be incorporated into or resident in a smart phone, a computer tablet, a PDA, or similar processing device.

The detector 14 generally includes a photomultiplier 20 operably connected to a control circuit 22. The photomultiplier 20 may include any photomultiplier tube or electronic device known to one of ordinary skill in the art for converting light into an electrical signal and amplifying the electrical signal. For example, as shown in FIG. 1, the photomultiplier 20 may include a vacuum tube 24 that houses a photocathode 26, several dynodes 28, and an anode 30. The control circuit 22 may include a power supply 32 that provides a high voltage output 34 to electrically bias the photocathode 26. Incident light 36 may enter the vacuum tube 24 and strike the photocathode 26 to cause a photoelectric effect. The photoelectric effect causes the photocathode 26 to emit electrons 38, and the electrons 38 then cascade to successive dynodes 28 creating secondary emissions that multiply the electron 38 flow. In this manner, the photomultiplier 20 receives light 36 and generates signals 40 reflective of the presence and/or magnitude of the light 36.

The control circuit 22 receives the signals 40 reflective of the light 36 from the photomultiplier 20. The control circuit 22 may include, for example, an amplifier 42 and a multichannel analyzer 44. The amplifier 42 increases or amplifies the signals 40, and the multichannel analyzer 44 processes the signals 40 to characterize the number and/or amplitude of the signals 40, corresponding to the amount and energy level of the light entering the photomultiplier 20. For example, the multichannel analyzer 44 may collate the amplified signals 40 into channels or counting windows, with each channel or counting window corresponding to a specific energy range of light 36 that entered the photomultiplier 20. In this manner, the multichannel analyzer 44 can provide an output 46 to the processor 12 indicating the number of counts of light 36 in each energy level that entered the photomultiplier 20.

Figure 2:
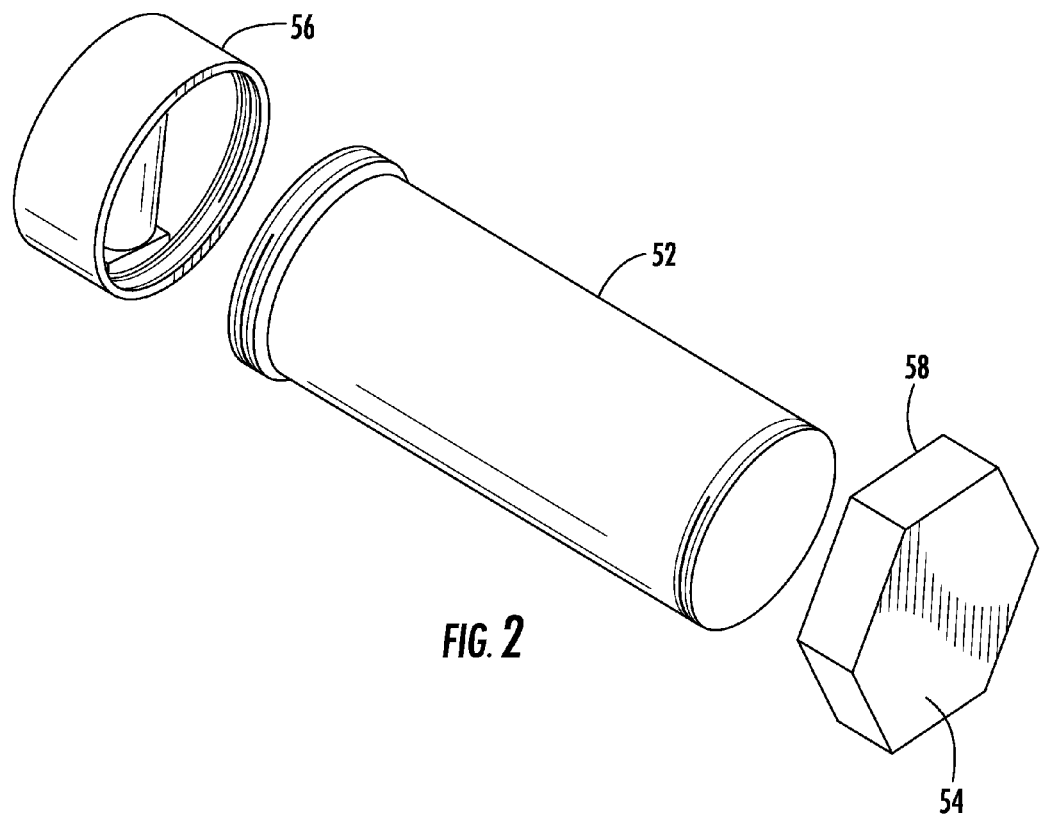
FIG. 2 is an exploded perspective view of the casing shown in FIG. 1 according to one embodiment of the present invention.

A casing 50 surrounds the photomultiplier 20 and control circuit 22 and provides a light impermeable barrier for the detector 14. The light impermeable barrier provided by the casing 50 prevents background or ambient light from entering the photomultiplier 20 that was not a direct result of or produced by the sample being measured. FIG. 2 provides an exploded perspective view of the casing 50 according to one embodiment of the present invention. As shown in FIG. 2, the casing 50 may include a body 52, a base 54, and a cap 56. The body 52 may be sized to completely enclose and conform to the size and shape of the photomultiplier 20 and the control circuit 32, and the base 54 and cap 56 may be releasably connected to the body 52 to facilitate easy opening and ready access to the photomultiplier 20 and/or control circuit 32. In addition, the base 54 and/or cap 56 may include one or more flat surfaces 58 to prevent the casing 50 from inadvertently rolling when assembled.

Figure 3:
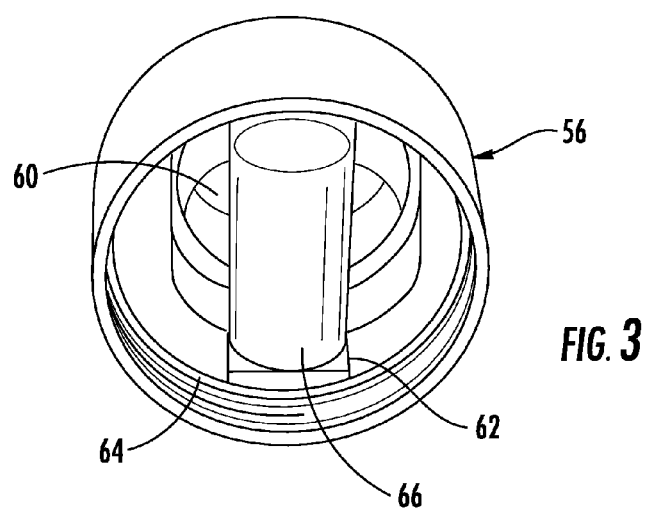
FIG. 3 is an axial perspective view of the cap shown in FIG. 2 holding a sample vial.
Figure 4:
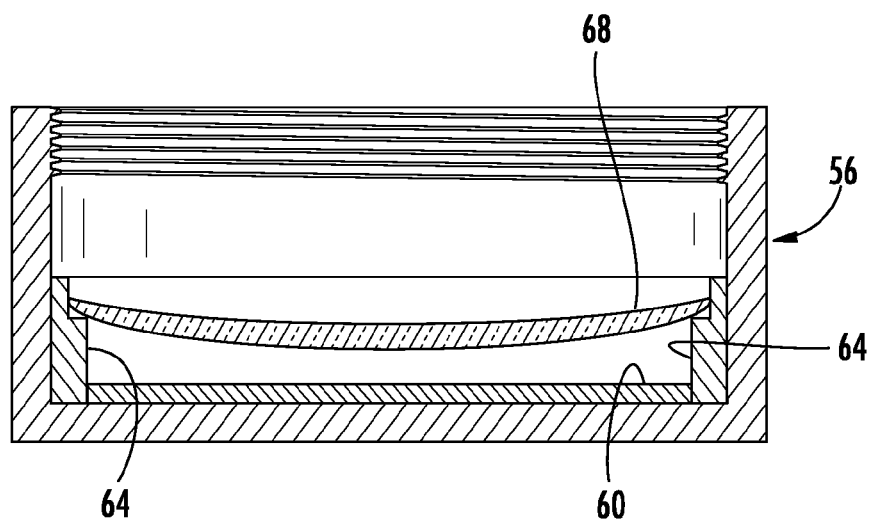
FIG. 4 is a side cross-section of the cap shown in FIG. 2 holding a sample dish.

FIG. 3 provides an axial perspective view, and FIG. 4 provides a side cross-section view of the cap 56 according to one embodiment of the present invention. As shown in FIGS. 3 and 4, the cap 56 may include a reflective surface 60 at one end, and a sample holder 62 may fit inside the cap 56. The reflective surface 60 may include, for example, a mirror or other suitable device, and the sample holder 62 is configured to hold a liquid scintillation solution. In this manner, the reflective surface 60 reflects any light produced by the liquid scintillation solution in the sample holder 62 towards the body 52 of the casing 50. The sample holder 62 may be a vial, vessel, or other container suitable for holding the liquid scintillation solution, and the cap 56 may further include an adapter 64 that accurately positions different sized sample holders 62 inside the cap 56 at a predetermined geometry from the photomultiplier 20. For example, as shown in FIG. 3, the sample holder 62 may be a cylindrical vial 66 that fits inside the cap 56, and the adapter 64 may hold the vial 66 in place inside the cap 56. A sample of material to be assayed may be placed or immersed in the liquid scintillation solution inside the vial 66, and the vial 66 may be inserted into the cap 56. Alternately, as shown in FIG. 4, the sample holder 62 may be a dish 68 or plate, and the adapter 64 may support the dish 68 inside the cap 56 at the desired geometry from the photomultiplier 20. A sample of the material to be assayed may be placed on or in the dish 68 and wetted with the liquid scintillation solution. In either event, the cap 56 may then be screwed onto or otherwise connected to the body 52 so that the sample holder 62 is at the desired geometry between the reflective surface 60 and the photomultiplier 20, and the casing 50 forms a light impermeable barrier around the sample holder 62, the photomultiplier 20, and the control circuit 22.

The system 10 described and illustrated with respect to FIGS. 1-4 may also provide a portable method for assaying radiation. The method includes placing a sample in a liquid scintillation solution, placing the liquid scintillation solution in the sample holder 62, and placing the sample holder 62 inside the light impermeable casing 50. The method further includes positioning the photomultiplier 20 inside the light impermeable casing 50 at a predetermined geometry from the sample holder 62 and supplying power to the control circuit 22 inside the light impermeable casing 50. In particular embodiments, the control circuit may generate an electrical bias for the photomultiplier 20 inside the light impermeable casing 50 and/or process the signal 40 reflective of light 36 from the liquid scintillation solution inside the light impermeable casing 50. In other particular embodiments, the method may further include transmitting the output 46 signal reflective of light 36 from the liquid scintillation solution to the processor 12 outside of the light impermeable casing 50 and operably connected to the control circuit 22.

The various embodiments shown and described with respect to FIGS. 1-4 provide one or more commercial and/or technical advantages over previous systems and methods for assaying radiation. For example, the casing 50 may completely surround the sample holder 62, photomultiplier 20, and control circuit 22 to provide the light impermeable barrier around the entire detector 14. As a result, the detector 14 may be far more portable than previous liquid scintillation detectors, allowing remote measurements of samples that may contain radionuclides that emit low energy beta and/or alpha radiation.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for assaying radiation, comprising:
   a sample holder configured to hold a liquid scintillation solution;
   a photomultiplier operably positioned at a predetermined geometry from said sample holder, wherein said photomultiplier receives light from the liquid scintillation solution and generates a signal reflective of the light;
   a control circuit operably connected to said photomultiplier, wherein said control circuit electrically biases said photomultiplier and receives said signal from said photomultiplier reflective of the light from the liquid scintillation solution; and
   a light impermeable casing that surrounds said sample holder, said photomultiplier, and said control circuit.

2. The system as in claim 1, wherein said sample holder comprises at least one of a vial or a dish.

3. The system as in claim 1, wherein said control circuit comprises a multichannel analyzer.

4. The system as in claim 1, wherein said control circuit supplies a high voltage output to said photomultiplier.

5. The system as in claim 1, wherein said light impermeable casing comprises a cap releasably connected to a body, wherein said sample holder fits inside said cap and said photomultiplier and control circuit fits inside said body.

6. The system as in claim 5, further comprising an adapter inside said cap, wherein said adapter positions said sample holder at said predetermined geometry from said photomultiplier.

7. The system as in claim 5, further comprising a reflective coating inside said cap.

8. The system as in claim 5, wherein said light impermeable casing further comprises a base releasably connected to said body.

9. The system as in claim 1, further comprising a processor outside of said casing and operably connected to said control circuit.

10. A system for assaying radiation, comprising:
    a cap;
    a body releasably connected to said cap, wherein said cap and body form a light impermeable casing when connected together;
    a sample holder inside said cap, wherein said sample holder is configured to hold a liquid scintillation solution;
    a photomultiplier inside said body at a predetermined geometry from said sample holder when said cap is connected to said body, wherein said photomultiplier receives light from the liquid scintillation solution and generates a signal reflective of the light;
    a control circuit inside said body and operably connected to said photomultiplier, wherein said control circuit electrically biases said photomultiplier and receives said signal from said photomultiplier reflective of the light from the liquid scintillation solution.

11. The system as in claim 10, wherein said sample holder comprises at least one of a vial or a dish.

12. The system as in claim 10, wherein said control circuit comprises a multichannel analyzer.

13. The system as in claim 10, wherein said control circuit supplies a high voltage output to said photomultiplier.

14. The system as in claim 10, further comprising an adapter inside said cap, wherein said adapter positions said sample holder at said predetermined geometry from said photomultiplier.

15. The system as in claim 10, further comprising a reflective coating inside said cap.

16. The system as in claim 10, further comprising a base releasably connected to said body.

17. The system as in claim 10, further comprising a processor outside of said light impermeable casing and operably connected to said control circuit.

18. A method for assaying radiation, comprising:
    placing a sample in a liquid scintillation solution;
    placing the liquid scintillation solution in a sample holder;
    placing said sample holder inside a light impermeable casing;
    positioning a photomultiplier inside said light impermeable casing at a predetermined geometry from said sample holder; and
    supplying power to a control circuit inside said light impermeable casing.

19. The method as in claim 18, further comprising processing a signal reflective of light from the liquid scintillation solution inside said light impermeable casing.

20. The method as in claim 18, further comprising transmitting an output reflective of light from the liquid scintillation solution to a processor outside of said light impermeable casing and operably connected to said control circuit.

* * * * *